United States Patent [19]

Voillot

[11] 4,434,701
[45] Mar. 6, 1984

[54] APPARATUS FOR CONVEYING CYLINDRICAL OBJECTS SUCH AS AMMUNITION

[75] Inventor: Hervé Voillot, Sartrouville, France

[73] Assignee: Creusot-Loire, Paris, France

[21] Appl. No.: 267,303

[22] Filed: May 26, 1981

[30] Foreign Application Priority Data

May 23, 1980 [FR] France .................. 80 11622
Jul. 4, 1980 [FR] France .................. 80 14977

[51] Int. Cl.³ .................. F41H 7/06; F41F 9/02
[52] U.S. Cl. .................. 89/36 K; 89/34;
198/580; 198/608
[58] Field of Search .................. 89/33 B, 33 BA, 34,
89/36 K; 198/580, 608

[56] References Cited

U.S. PATENT DOCUMENTS 924,732 6/1909 Carey .................. 89/33 B

Primary Examiner—Stephen C. Bentley
Attorney, Agent, or Firm—Pollock, Vande Sande & Priddy

[57] ABSTRACT

Apparatus for conveying cylindrical objects such as ammunition by means of a series of separate seating plates driven to rotate in synchronism, associated with two guiding members separated by a distance at least equal to the diameter of the objects, the whole forming a guideway for advancing objects by successive displacements. The advancing guideway is constituted, in succession, by an upstream guideway (1), an intermediate guideway (2) and a downstream guideway (3), and the intermediate guideway (2) is constituted by one part of a magazine (20) the other part of which is constituted by an additional guideway (2') which closes at its two ends on the intermediate guideway (2) so as to form a closed guideway pg,2 associated with a series of seating plates forming a closed chain with the plates of the intermediate guideway. Two switches (6, 7) positioned respectively at the ends of the intermediate guideway (2) are capable of assuming two positions assuring continuity of the intermediate guideway (2) either with the upstream guideway (1) and the downstream guideway (3), or with the additional guideway (2') forming the other part of the magazine (20).

12 Claims, 18 Drawing Figures

APPARATUS FOR CONVEYING CYLINDRICAL OBJECTS SUCH AS AMMUNITION

The object of the invention is an apparatus for conveying cylindrical objects and is more especially applicable to the feeding of a gun with several types of ammunition.

A gun, particularly an anti-aircraft gun, is formed by a turret orientable in azimuth about an axis and a swinging mass bearing the barrel, orientable in elevation about an axis perpendicular to the axis of the turret. Ammunition is put in a magazine and is introduced at the axis of the turret by an elevator, then conveyed to the gun by an advancing apparatus.

This advancing apparatus generally acts by successive displacements and comprises a series of rotary drive members, each constituted by at least two seating plates fixed on a shaft, the said shafts being driven to rotate in synchronism and disposed parallel and at an equal distance from each other along a surface parallel to two spaced guiding members forming a guideway with a width substantially equalling that of the objects.

Each piece of ammunition is thus loaded into the seats of a pair of plates and then pushed inside the guideway so as to be loaded into the succeeding plates and so on, the plates, being slightly staggered from pair to pair, so that they overlap.

Four-seated plates which are therefore in the shape of a Maltese cross are in current use. There is no need to describe the system of advancing by means of plates in further detail; it is well known and allows the piece of ammunition to be pushed progressively by successive displacements inside the guideway.

The advancing guideway in gun feed systems is generally constituted by two successive parts termed "fixed guideway" and "movable guideway".

The fixed guideway is solid with the turret and progressively passes each piece of ammunition from the position of introduction at the axis of the turret to an exit position parallel to the axis for orientation in elevation of the swinging mass.

The movable guideway is solid with the swinging mass and passes the piece of ammunition from the position for exit from the fixed guideway parallel to the axis for orientation in elevation to a position parallel to the axis of the gun from which the piece of ammunition is introduced into the breech.

Such guns are particularly used for anti-aircraft defense on warships. In this instance, it is most important to have a high rate of fire available and to be able to control firing with as short a response time as possible. Such guns are therefore equipped with automatic magazines which allow firing to be controlled from the bridge. However, the gunnery officer may wish to use certain special types of ammunition, such as star shells.

The object of the invention is an apparatus which allows special ammunition to be kept in reserve and fired at will without hindering the firing of ordinary ammunition.

The invention is not limited to the feeding of guns with special ammunition, but can be more generally applied whenever the capacity to incorporate objects kept in reserve into a succession of objects moving inside an advancing guideway is required.

In conformance with the invention, the advancing guideway is constituted by three successive parts forming, respectively an upstream guideway, an intermediate guideway and a downstream guideway. The intermediate guideway is constituted by one part of a magazine in the form of an advancing guideway closed back on itself and constituted by a closed chain of pairs of seating plates surrounded by a guiding member which is interrupted at the entry and exit of the intermediate guideway, respectively for the passage of objects coming from the upstream guideway and going towards the downstream guideway.

The magazine is also associated with two switches positioned respectively at the upstream and downstream ends of the intermediate guideway, and with means for controlling the orientation of the two switches alternately in a first position assuring continuity of the intermediate guideway respectively with the upstream guideway, and with the downstream guideway and in a second position assuring continuity of the intermediate guideway, respectively upstream and downstream, with the rest of the magazine.

In a preferred embodiment, the magazine comprises n pairs of plates providing n successive locations and is partially filled with objects kept in reserve and regularly distributed in a groups of b objects between which unoccupied locations are provided and the objects coming from the upstream guideway are inserted during their passage in the intermediate guideway in the unoccupied spaces left between the groups of objects kept in reserve.

The objects advanced in the upstream guideway are preferably separated from each other by b unoccupied locations and the drive plates of the magazine and the upstream guideway are controlled in synchronism so that the arrival in the intermediate guideway of an object coming from the upstream guideway coincides with the passage of an unoccupied location in the magazine, the upstream switch being successively in the first position for continuity of the upstream guideway with the intermediate guideway for the passage of each object coming from the upstream guideway and in the second position for continuity of the magazine for the passage of b objects in reserve, and so on, alternately, the downstream switch being controlled in the same way with an interval corresponding to the number of locations in the intermediate guideway.

In addition, the two upstream and downstream switches are associated respectively with an entry plate and an exit plate positioned at the end of the shaped guideway constituting the magazine, and the two entry and exit plates respectively constitute the last plate of the upstream guideway and the first plate of the downstream guideway.

In the case of the feeding of an artillery turret with ammunition, it is advantageous for the magazine in which the special ammunition is kept in reserve to be positioned as near as possible to the end of the advancing guideway, one part of which is formed by the intermediate guideway.

In view of its weight and bulk, the magazine must be positioned in the turret mounting. An additional advantage of the arrangements according to the invention lies in the fact that it is possible to position the end of the intermediate guideway at the height of the axis of the trunnions, so that a special piece of ammunition in reserve in the additional guideway passes directly into the movable guideway which constitutes the downstream guideway in this instance.

To obtain this, the axis of the exit plate of the intermediate guideway is made to coincide with the axis of the trunnions, the exit plate and the succeeding plate of the downstream guideway being positioned one on one side and one on the other of the latter, and the intermediate guideway is connected to the downstream guideway by an incurving connecting guideway forming successively a circular curve of variable length depending on the orientation of the gun, centered on the axis of the trunnions and joing up tangentially in the upstream direction with the intermediate guideway and in the downstream direction with a circular counter-curve centered on the axis of the succeeding plate of the downstream guideway and joining up tangentially with the latter.

Access time for the special ammunition is reduced to a minimum by means of this arrangement and additional characteristics which will be described in detail hereinafter.

In addition, these particular arrangements as a whole have the great advantage of omitting the angular point which existed in previously known arrangements at the articulation between the fixed guideway and the movable guideway. It is thus possible to pass the ammunition continuously from the fixed guideway to the movable guideway, whatever the orientation of the gun and even during orienting movement.

The invention will now be described with reference to several embodiments represented diagrammatically in the attached drawings.

Figure 1:
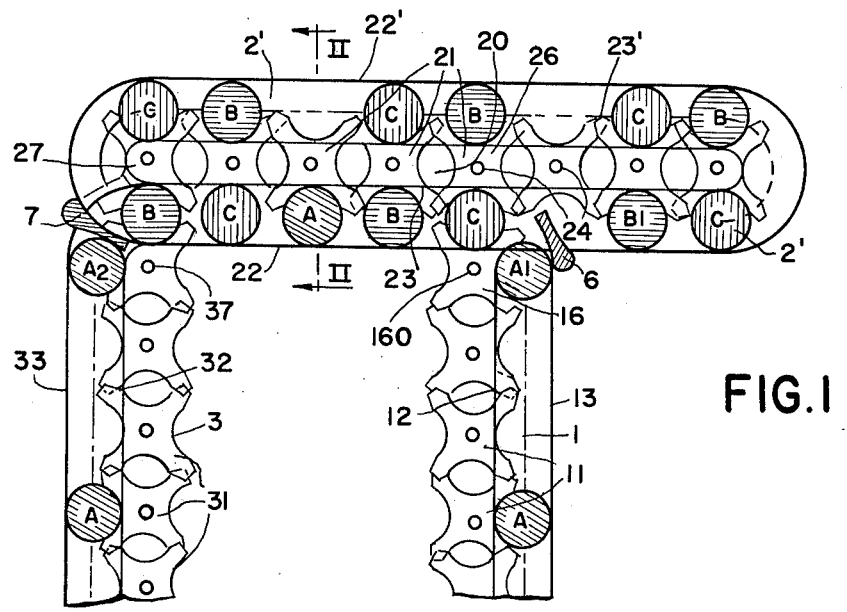
FIG. 1 is a diagrammatic view of a simplified embodiment of the advancing guideway associated with a reserve magazine according to the invention.

FIG. 1 shows diagrammatically a simplified embodiment of an advancing guideway which, according to one characteristic of the invention, is formed of three successive parts: an upstream guideway 1, an intermediate guideway 2 and a downstream guideway 3.

Each of these guideways is conventionally constituted by two parallel guides separated by a distance equalling the thickness of the objects conveyed and associated with a series of seating plates the axes of which are aligned on a line parallel to the guides so that the bottoms of the seats are tangential, to a close tolerance, to one of the guides termed "inner guide", the other being the outer guide.

Thus, the upstream guideway 1 is constituted by the series of plates 11, associated with the rectilinear guides 12 and 13, the intermediate guideway 2 by the plates 21 associated with the guides 22 and 23 and the downstream guideway 3 by the plates 31 associated with the guides 32 and 33.

The intermediate guideway 2 also constitutes one part of a magazine 20 the other part of which forms an additional guideway 2' which is closed at its two ends on the guideway 2, the whole forming a closed guideway.

This additional guideway 2' is also bounded by two guides 22' and 23' which are positioned as extensions of the guides 22 and 23 of the intermediate guideway 2 so as to form two cylindrical closed and parallel surfaces.

Thus, the upstream guideway 1 and the additional guideway 2' form a bifurcation which converges at the upstream end of the intermediate guideway 2 the downstream end of which opens by a second bifurcation into the downstream guideway 3 and the additional guideway 2'.

The inner guides 23 and 23' of the guideways 2 and 2' are consequently able to form a continuous guiding surface in the center of the magazine 20. Similarly, the outer guide 22 of the guideway 2 is positioned as an extension of the guides 12 and 32 of the guideways 1 and 3.

On the other hand, the ends of the outer guides 22 and 22' must be separated by two gaps allowing the passage of ammunition coming from the upstream guideway 1 or going to the downstream guideway 3.

These two gaps are respectively filled by an upstream switch 6 and a downstream switch 7 which can each be oriented individually in two positions assuring continuity of the intermediate guideway in a first position with the upstream guideway and the downstream guideway and in a second position with the additional guideway 2' to close the magazine.

To obtain this, the two switches are each constituted by an arm pivoting about an axis positioned between the ends of the outer guide 22' of the magazine 20 and of the guides 13 and 33 of the guideways 1 and 3. The two arms 6 and 7 thus ensure on one face, in the first position, connection between the inner guide 23 of the intermediate guideway 2 and respectively the guides 13 and 33 of the upstream 1/and downstream 3 guideways and on the other face, in the second position, connection of the outer guide 22 of the intermediate guideway 2 with, respectively, the two ends of the outer guide 22' of the additional guideway 2'.

Figure 2:
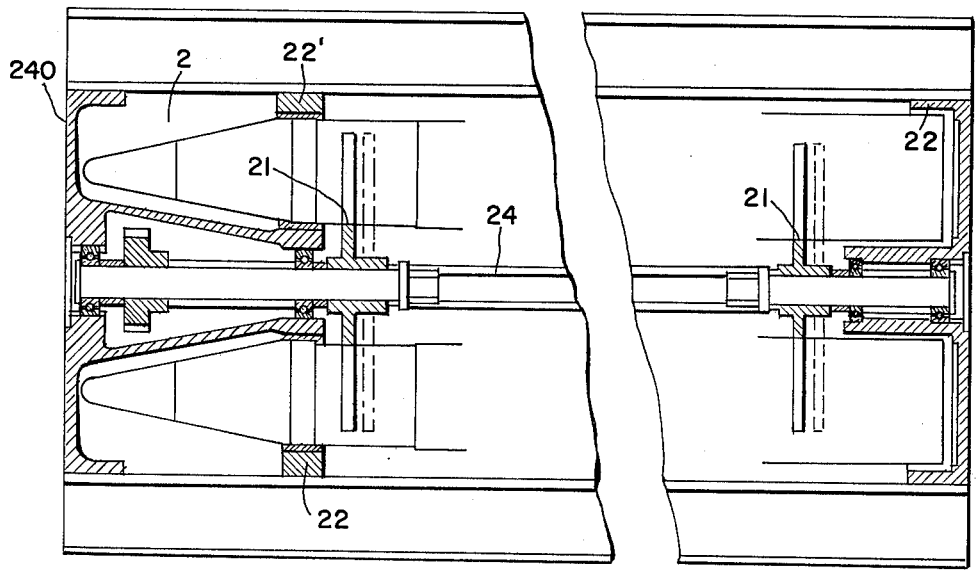
FIG. 2 is a view of the magazine in transverse section at a plane passing through a plate drive shaft.

As represented in FIG. 2, which is a transverse section of the magazine 20, the plates are disposed in two parallel series spaced apart from one another, and are fixed in pairs on shafts 24 driven to rotate in synchronism, so that at any moment the ammunition is either held between the two guiding members each constituted, for example, by two rails provided with a sliding surface, or loaded into the seats of two plates bearing on the cartridge, one, termed "front plate", at the crimped part and the other, termed "rear plate", at the cartridge flange. The plates of the two successive pairs are slightly staggered, in a conventional manner, as represented in FIG. 2, so that the arms in a Maltese cross overlap and cause the piece of ammunition to move forward from one pair of plates to the next while supported by the guides.

In addition, the two switches 6 and 7 are associated with two plates 16 and 37, respectively for entry and exit, positioned outside the closed guideway constituting the magazine 20 opposite the plates 26 and 27 of the series 21 corresponding to the ends of the intermediate guideway 2; the entry plate 16 is positioned at the end of the series of plates 11 of the upstream guideway 1 while the exit plate 37 is at the beginning of the series of plates 31 of the downstream guideway 3.

In this way, when the switch 6 is in the first position represented in continuous line in FIG. 1, which assures continuity of the upstream guideway 1 with the intermediate guideway 2, a piece of ammunition A1 arriving at the end of the upstream guideway 1 is loaded into the entry plate 16 and then into the plate 26 turning in synchronism with it and in the reverse direction and the two plates 16 and 26 simultaneously incorporate it in the series of plates 21 of the intermediate guideway 2.

Similarly, at the entry of the guideway 2, when the front switch 7 is in the first position represented in continuous line in FIG. 1, which assures continuity of the intermediate guideway 2 with the downstream guideway 3, the piece of ammunition A2 arriving at the end of the guideway 2 is simultaneously loaded into the plates 27 and 37 and then escapes to the plate 27 by remaining held in the exit plate 37 which introduces it into the downstream guideway 3 and incorporates it in the series of drive members 31 which drive it downstream.

On the other hand, when the switches 6 and 7 are in the second position, for continuity of the magazine, the plates 16 and 37 behave in the same way, respectively, as the plates 26 and 27, by being loaded at the same time as the latter with the ammunition coming from the additional guideway 2' or going towards the latter.

As represented in the figures, the plates are preferably shaped like a Maltese cross comprising four drive arms between which four seats are provided and allowing four pieces of ammunition to be moved forward at each turn of the shaft 23.

This Maltese cross shape allows the same series of plates 21 to be used to move the ammunition forward in the intermediate guideway 2 and in the additional guideway 2' of the magazine 20. In fact, in this instance, as represented in FIG. 1, the magazine 20 is shaped like a flat drum which is symmetrical with respect to the plane passing through the axes of the series of plates 21. The number of plates and consequently the length of the magazine depends on the number of locations for pieces of ammunition required to be disposed inside the magazine. In fact, as FIGS. 1 and 2 show, each pair of plates simultaneously controls the forward progress of two pieces of ammunition in the two guideways enclosing it and, in view of the two additional locations positioned at the two ends of the magazine, it becomes evident that if n locations are required to be available, the magazine must have a number of plates equal to $n/2 - 1$.

The Maltese cross shape of the plates facilitates the introduction into the intermediate guideway 2 of ammunition coming from the upstream guideway 1 and its discharge through the downstream guideway, as represented in FIGS. 3, 4, 5, 6, in which the plates are only represented diagrammatically.

Figure 3:
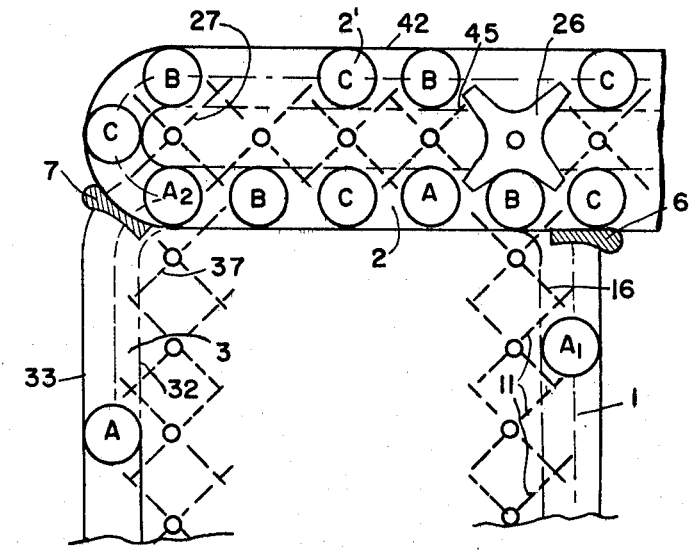
FIGS. 3 to 6 represent diagrammatically the successive stages of the passage of ammunition into the intermediate guideway.

FIG. 3 shows the arrival of an ordinary piece of ammunition of type A at the end of the upstream guideway 1, before it is loaded into the last plate 16.

In this position, the entry plate 16 contains a piece of ammunition of type B held in reserve in the magazine 20. In fact, the latter is loaded, according to the invention, with a certain number of pieces of special ammunition of type B and C, and these are distributed in several groups of the two pieces of ammunition separated by an unoccupied space.

An essential feature of the invention consists in providing for the passage of the unoccupied space in front of the exit of the upstream guideway 1 to coincide with the arrival of a piece of ammunition A at the end of this guideway. In the position represented in FIG. 3, a piece of ammunition of type C has arrived at the entry of the intermediate guideway 2, the upstream switch 6 being in the second position defined hereinbefore which assures continuity of the additional guideway 2' with the intermediate guideway 2.

Figure 4:
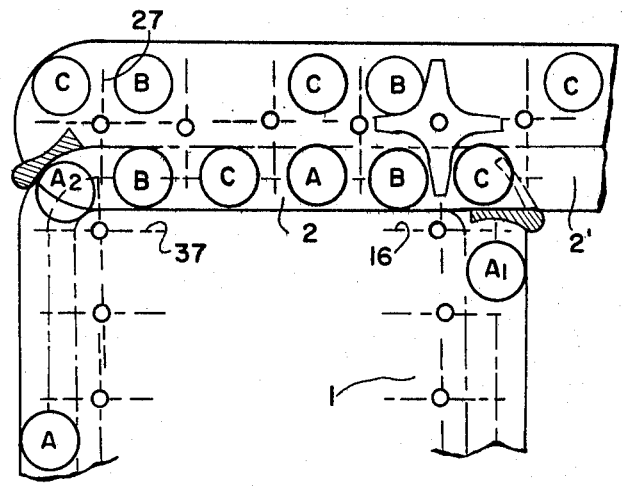

FIG. 4 represents the piece of ammunition C entering the intermediate guideway and being loaded into the entry plate 16, the Maltese cross shape allowing the latter to be loaded simultaneously with the piece of ammunition of type A arriving at the end of the upstream guideway 1.

In FIG. 5, the plates have again turned by ⅛ of a turn. The entry plate 16 has discharged the piece of ammunition B which has been loaded into the succeeding plate 211 of the series of plates 21 of the guideway 2. On the other hand, the entry plate 16 is simultaneously loaded with the piece of ammunition A and the piece of ammunition C which is held in the plate 26.

At the same time, the switch 6 is set in the first position, assuring continuity of the upstream guideway 1 with the intermediate guideway 2.

This is possible because there is an unoccupied space behind the piece of ammunition C.

Figure 6:
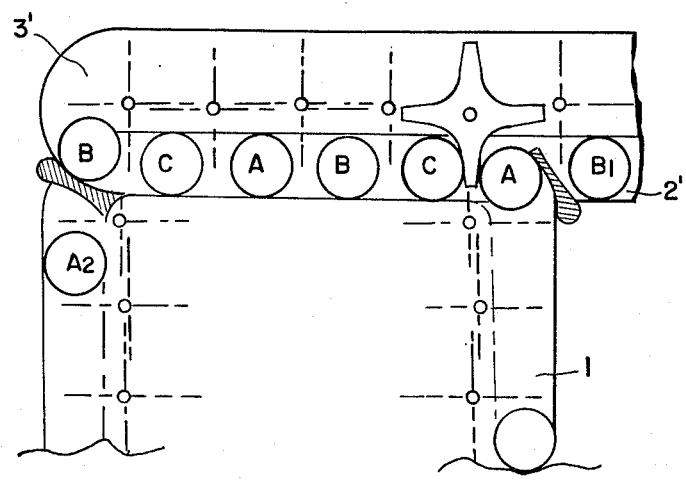

In this way, when, after ⅛ of a turn, the position of FIG. 6 is reached, the piece of ammunition A is ready to enter the intermediate guideway 2 in which the pieces of ammunition B and C are completely engaged.

At this moment, a new piece of ammunition B1 of the series B arrives at the end of the additional guideway 2'.

When the plates again turn by ⅛ of a turn, the piece of ammunition A takes the position vacated by the piece of ammunition B in FIG. 3. The switch 6 returns to the second position, assuring continuity of the guideway 2' with the intermediate guideway 2, and the piece of ammunition B1 comes into the position which was that of the piece of ammunition C in FIG. 3, i.e. at the entry of the intermediate guideway 2.

It is seen that the piece of ammunition A coming from the upstream guideway 1 is thus incorporated in a continuous way in the stream of ammunition moving inside the magazine, the switch setting alternately in one position and then the other for passage of the ammunition coming either from the upstream guideway 1 or from the additional guideway 2'.

In the example represented, each piece of ordinary ammunition of type A is inserted between two groups of special ammunition in reserve in the magazine, each comprising two pieces of ammunition of types B and C. For this reason, as indicated, the entry plate 16 must be loaded with a piece of ammunition of type A only one time in three. This is achieved, for example, by providing for pieces of ammunition of type A feeding the plate 16 to be separated from each other in the upstream guideway 1 by two unoccupied locations.

In addition, the operation just described shows that for each cycle, corresponding to the successive passage of pieces of ammunition of the three types, A, B and C, the upstream switch 6 must be in the first position for one third of the cycle and in the second position of the other two thirds.

Figure 7:
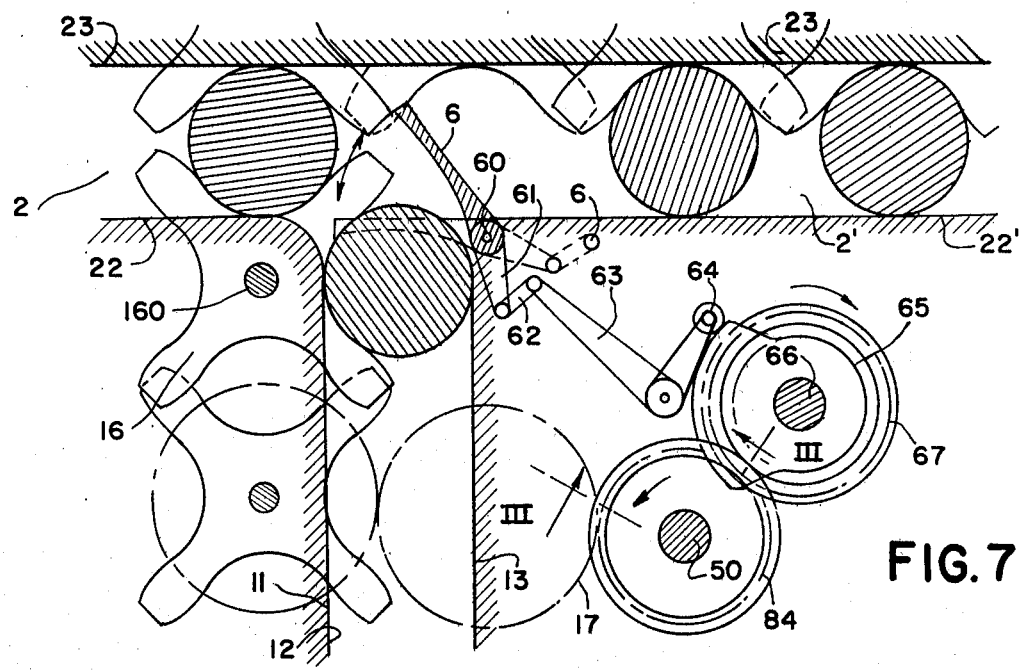
FIG. 7 is a detailed view of the upstream end of the intermediate guideway and the upstream switch.

This is achieved very simply by a cam system which is represented diagrammatically in FIG. 7.

The upstream switch 6 is constituted, as indicated hereinbefore, by two arms mounted to pivot about an axis 60 positioned between the outer guides 13 and 22' of the upstream guideway 1 and of the additional guideway 2' and which set as extensions either of the outer guide 22' in the direction of the outer guide 22 of the intermediate guideway 2, or of the outer guide 13 in the direction of the inner guide 23 of the guideway 2. To achieve this, the arms of the switch 6 are provided on the outer side with a plane face and on the inner side with a circular concave face which, in the first position, represented in continuous line in FIG. 7, is centered on the axis 160 of the entry plate 16.

Pivoting of the switch 6 is controlled by a crank 61 connected by a rod 62 to the end of a lever 63 which, in the example represented, is a bent lever, and the other end of which bears, through a wheel 64, on a cam 65.

The profile of the cam 65 is designed to control the movement and holding of the switch 6 periodically in the first position over one third of the cycle, and in the second position over the other two thirds.

To obtain this, the cam 65 is mounted on a shaft 66 driven to rotate in synchronism with all the plates of the different guideways from a general mechanical control, so that the shaft 66 makes a complete turn each time the plates have turned through $\frac{3}{4}$ of a turn and have consequently controlled the forward progress of three pieces of ammunition, which corresponds to one cycle in the example represented.

The mechanical control will be described in more detail hereinbelow, with reference to FIG. 8.

The issue of ammunition from the downstream end of the intermediate guideway 2 proceeds in a similar way to that described for entry of ammunition.

Figure 5:
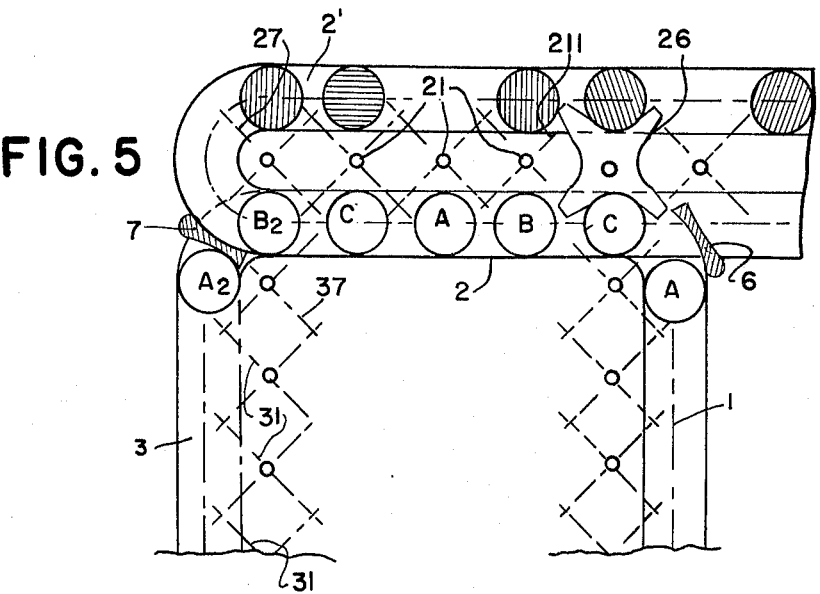

FIG. 3 shows the arrival of a piece of ammunition of type A in the exit plate 37 which is loaded with the piece of ammunition A at the same time as the last plate 27 of the intermediate guideway 2, and then transfers it to the downstream guideway 3, the first plate of which it constitutes. The switch 7 is then, as represented in FIG. 4, in the first position, assuring continuity of the intermediate guideway 2 with the downstream guideway 3. The rotation of the plates consequently causes the piece of ammunition A2 to issue from the magazine as indicated in FIG. 4. When the plates have turned by a quarter turn to come into the position of FIG. 5, the piece of ammunition A2 is at the entry of the downstream guideway 3 and the switch 7 is in the second position of continuity of the guideway 2 with the additional guideway 2', while the exit plate 37 is loaded with the piece of ammunition B2 at the same time as the plate 27 (FIG. 5).

Thus, when the plates continue to turn, the piece of ammunition B2 leaves the guideway 2 to enter the additional guideway 2' of the magazine while the piece of ammunition A2 is incorporated in the succession of plates 31 of the downstream guideway 3 so as to be conveyed to the gun. The switch 7 is kept in the same second position for the passage of C2 (FIG. 6) and then returns to the first position for the passage of the next piece of ammunition A. Thus, the downstream guideway 3 and the upstream guideway 1 share the common characteristic of containing ammunition of type A separated by two unoccupied seatings.

The switch 7, like the switch 6, must be in the first position for one third of the cycle and in the second position for the other two thirds.

Figure 9:
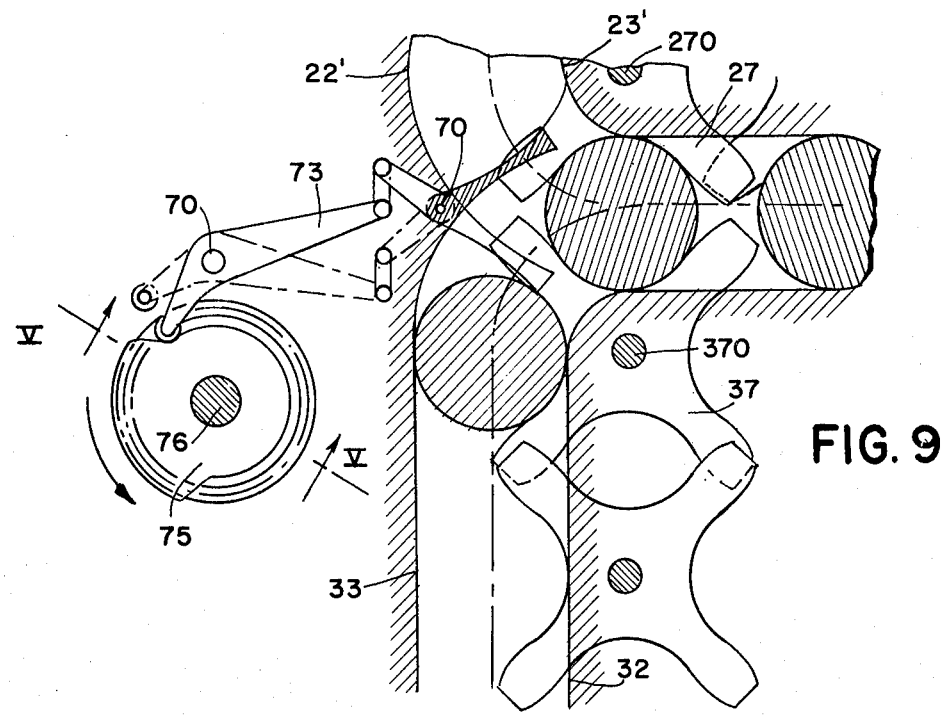
FIG. 9 is a view in detail of the downstream end of the intermediate guideway and the downstream switch.
Figure 10:
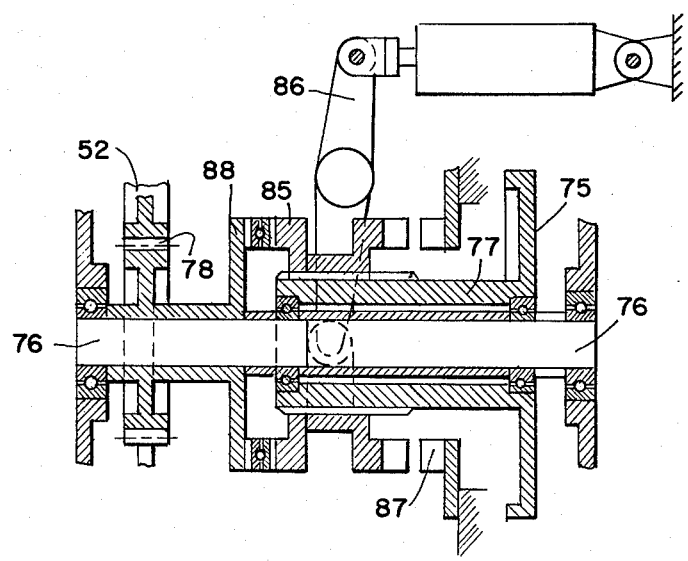
FIG. 10 is a view in axial section at BB, FIG. 9 of the mechanical control of the guideway and the downstream switch.

Its control is obtained, in a similar way to that described for the switch 6, by a lever 73 controlled by a cam 75 fixed on a shaft 76 driven to rotate by the general mechanical control so as to make a complete turn each time the plates have turned through $\frac{3}{4}$ of a turn (FIGS. 9 and 10).

The switch 7 is also formed by arms mounted to pivot about an axis 70 positioned between the outer guides 33 of the guideway 3 and 22' of the guideway 2 and provided with concave circular faces which are positioned alternately as extensions of the guides 33 and 22' and are therefore centered respectively on the axis 370 of the exit plate 37 in the first position and on the axis 270 of the plate 27 in the second position.

The method just described also allows the downstream guideway 3 to be fed continuously with ammunition of type A introduced by the upstream guideway 1, while keeping ammunition of type B and C in reserve in the magazine 20.

Loading of the magazine with ammunition of type B and C is carried out from the upstream guideway 1, the switches 6 and 7 being positioned in the positions of FIGS. 5 and 6. The downstream guideway 3 must also be able to be fed with the ammunitions of type B and C kept in reserve, the switches 6 and 7 being then in the positions of FIGS. 3 and 4. For this reason, the controls of the switches 6 and 7 must be disconnectable so as to keep the latter in one or the other position, as required.

Figure 8:
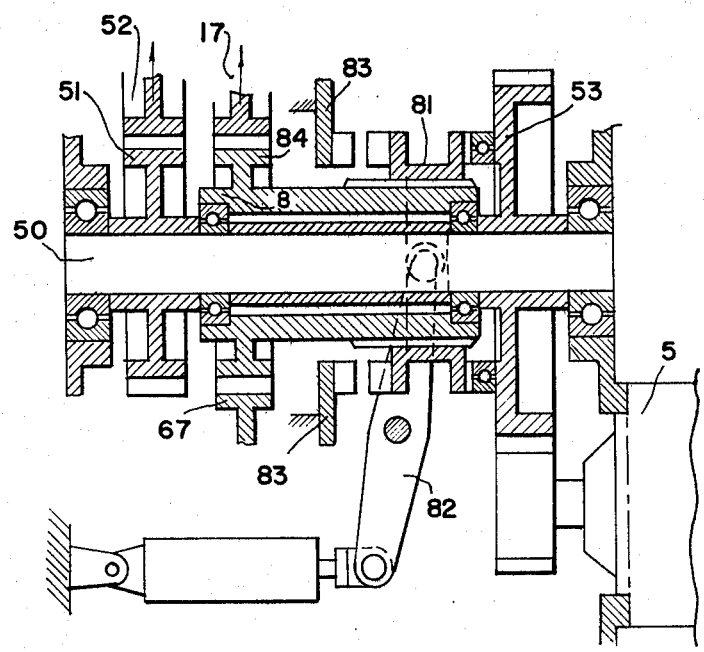
FIG. 8 is a view in axial section at AA, FIG. 7 of the mechanical control of the guideway and the upstream switch.

The mechanical control of the switches 6 and 7 is represented diagrammatically in FIGS. 8 and 10, respectively.

FIG. 8, which represents the control for the plates and the upstream switch 6, shows diagrammatically the general control motor 5 which drives, through a reducer, a shaft 50 on which the various pinions are centered.

In fact, the shaft 50 directly drives, through a pinion 51, a kinematic chain represented by its first pinion 52 and which is constituted by a series of pinions of the same radius meshing with each other and controlling in synchronism the rotation of the plates of the magazine 20 and, also, of the downstream guideway 3 by a control represented by FIG. 10, to be described hereinafter.

The ratios of the pitch circles are set so that, if the shaft 50 turns at n turns per minute, the plates are driven at a speed of 4n/3 turns, per minute.

In addition, a sleeve 8, provided with grooves allowing it to be driven by a direct-drive dog clutch 81 mounted to slide longitudinally, turns freely on the shaft 50 on rolling bearings.

A fork 82, conventionally actuated, for example by an actuator, allows the direct-drive dog clutch 81 to be made solid in rotation either with a fixed part 83 allowing the sleeve 8 to be immobilized or with a drive pinion 53 fixed on the shaft 50. In this way, according to the position of the direct-drive dog clutch 81, the sleeve 8 can be immobilized or driven to rotate at the speed of the shaft 50.

In addition, the sleeve 8 is solid with a pinion 84 which meshes on the one hand with a pinion 67 fixed on the shaft 66 for driving the cam 65 (FIG. 7), and on the other hand with the upstream pinion 17 of a kinematic chain for driving the series of plates 11 of the upstream guideway 1 in synchronism.

The pinions 84 and 67 have the same pitch radius, so that the shafts 50 and 66 turn at the same speed. On the other hand, the pitch radii of the pinions 84 and 17 are set in a ratio such that, with each turn of the shaft 50, there is a corresponding rotation of 4/3 of a turn of the plates 11 of the upstream guideway.

It will also be noted that the entry plate 16 is driven to rotate continually by the kinematic chain 52 controlling the magazine.

The arrangement just described therefore allows the upstream guideway 1 to be stopped and the switch 6 to be locked in the second position for continuity of the magazine without halting driving of the plates of the magazine 20 and of the downstream guideway 3. It is thus possible to feed the downstream guideway 3 with the special ammunition kept in reserve in the magazine 20.

However, in this instance, the downstream switch 7 must remain locked in the second position for continuity of the intermediate guideway 2 with the downstream guideway 3. This is obtained by means of a similar arrangement represented diagrammatically in FIG. 10.

The control cam 75 of the downstream switch 7 is fixed on a sleeve 77 which is borne by rolling bearings on a shaft 76. The sleeve 77 can also be driven to rotate by a direct-drive dog clutch 85 which meshes with grooves provided in the sleeve and which is actuated by a fork 86 allowing it to be made solid either with a fixed part 87 or with a pinion 88 fixed on the shaft 76.

The latter is solid with a pinion 78 connected by the kinematic chain 52 to the drive shaft 50.

The ratios of the pinions are so selected that the shaft 76 turns at the same speed as the drive shaft 50.

According to the position of the direct-drive dog clutch 85, this apparatus therefore allows either the rotation of the cam 75 to be controlled at the same speed as the cam 65 of the upstream switch 6, or the cam and consequently the switch 7 to be immobilized in a predetermined position. It is therefore possible to lock the switch 7 either in the first position to feed the downstream guideway with the special ammunition kept in reserve in the magazine, or in the second position, for example, for loading the magazine with special ammunition.

The invention has been described with reference to a diagrammatic embodiment which will clearly need to be adapted to the characteristics of the installation required to be equipped with a reserve magazine.

Figure 11:
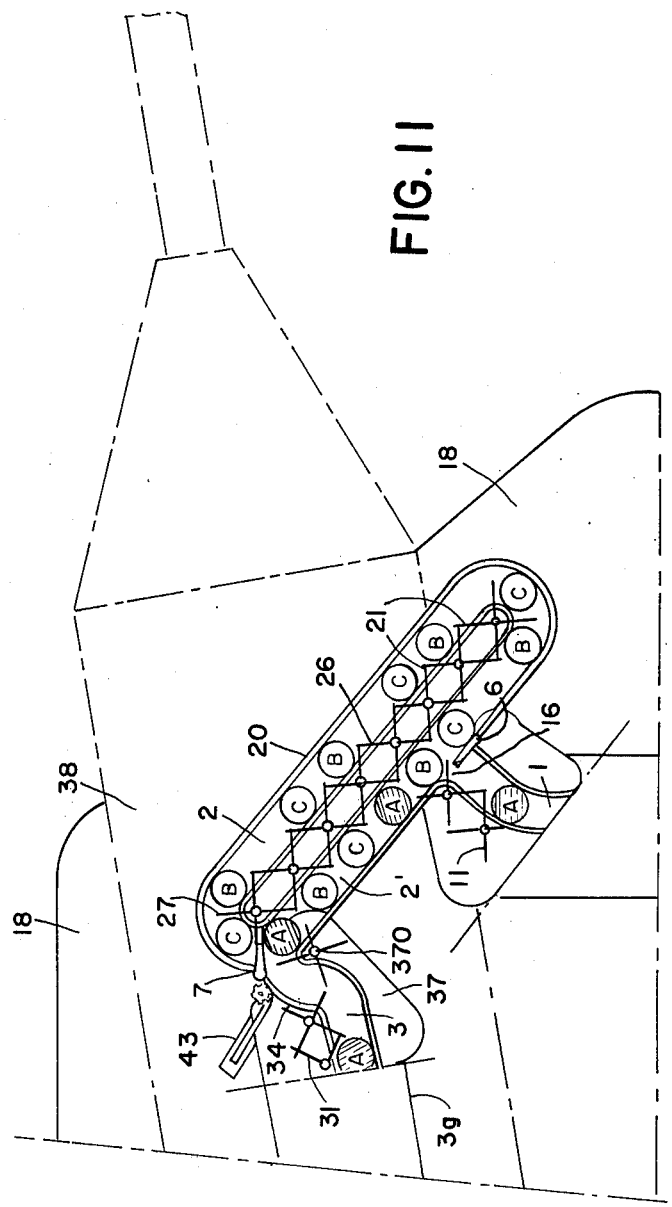
FIG. 11 is a schematic view of an artillery turret incorporating the present invention.

Thus, as indicated in FIG. 11, the invention is particularly well suited to feeding with ammunition an artillery turret comprising a fixed mounting 18 and a swinging mass 38 supporting the barrel of the gun 39 (see FIGS. 11 to 18).

In this arrangement, the upstream guideway 1 and the magazine 20 comprising the intermediate guideway 2 and the additional guideway 2' are positioned in the fixed mounting 18, while the downstream guideway 3 is mounted in a frame 39 solid with the swinging mass 38 and turning with this about a trunnion axis 370.

According to one characteristic of the invention, the magazine is so disposed that the axis 370 of the exit plate 37 coincides with the axis of the trunnions. The exit plate 37 and the following plate 34 of the downstream guideway 3 are also positioned to each side of the latter.

It has already been indicated that the exit plate 37 is driven in synchronism with and in the reverse direction to the plates 21 of the magazine 20, for example by means of two toothed wheels of the same diameter fixed respectively on the shafts 370 and 270 of the exit plate 37 and the last plate 27 of the magazine 20 and meshing with each other.

In the same way, two toothed wheels 371 and 341, with pitch diameters equal to the inter-axial spacing of the plates 37 and 34, are fixed on the shafts 370 and 340 of the exit plate 37 and the succeeding plate 34 of the downstream guideway 3.

In this way, when the downstream guideway 3 is oriented about the axis of the trunnions, i.e., axis 370, the entry wheel 341 driving the plate 34 rolls on the toothed wheel 371 of the exit plate 37. Thus, the plate 34 is always driven in synchronism with the plate 37 but in the reverse direction, whatever the orientation of the downstream guideway 3. In addition, the plate 34 conventionally drives the other plates 31 of the downstream guideway 3 in synchronism by means of pinions of the same diameter connected by intermediate pinions, for example.

The synchronized rotary movement can thus be transmitted from the upstream guideway 1 to the magazine 20 and then, by the plate 37, to the movable guideway 3 from the common drive motor 5.

However, the toothed wheel 341 is connected to the axis of the plate 34 by a disconnectable coupling which, as indicated hereinbefore, allows the downstream guideway 3 to be disconnected when the switch 7 is in the position for continuity with the additional guideway 2' of the magazine 20.

Continuity between the intermediate guideway 2 and the movable downstream guideway 3 is assured by an incurving connecting guideway 4 bounded by two parallel guides assuring continuity, one between the guides 22 and 23 and the other between the guides 23 and 32, respectively, of the intermediate guideway 2 and the downstream guideway 3. According to one characteristic of the invention, the incurving connecting guideway 4 is constituted by a first part 40 forming a circular curve centered on the axis 370 of the exit plate 37 and a second part 41 forming a circular counter-curve centered on the axis 340 of the first plate 34 of the series of plates 31 of the downstream guideway 3. The pitch circles of the toothed drive wheels 371 and 341 of the plates 37 and 34 follow the median line of the two parts 40 and 41 of the connecting guideway 4.

The two parallel guides bounding the two curved parts 40 and 41 are tangential at their ends respectively to the guiding rails of the two fixed 2 and movable 3 guideways, and include points of inflection A and B positioned in the plane P passing through the axes 370 and 340 of the plate 37 and the plate 34.

As the movable guideway 3 turns about the axis 370, the guides corresponding to the curve 40 centred on the axis 370 must be of variable length.

At the axis 370, this result can be obtained by extending the guiding rails 22 with circular rails 220 centred on the axis 370 and turning about this axis. The rest of the guiding means corresponding to the counter-curve 41 is constituted by circular rails 320 fixed as extensions of the guiding rails 32 of the downstream guideway 3 and coupling tangentially with the rails 220 of the curved part 40.

One of the guiding means of the connecting guideway 4 is therefore constituted by rails 220 and 320, and rails 220 having an active length between the end C of the intermediate guideway 2 and the point of inflection B the position of which along the rails 220 depends on the orientation of the downstream guideway 3.

Such a system cannot be used for the reverse guiding means which is coupled to the guides 23 and 33 of the guideways 2 and 3. For this reason, an original system represented in the drawings is used.

Fixed at the end of each of the guiding rails 23 is a chain 42 the end 421 of which is fixed on the end of the outer guide 22' of the magazine 20, near the pivoting axis 70 of the switch 7, and one part 423 of which forms a circular curve centered on the axis 370 and positioned as an extension of the switch 7 and of the inner guide 23 of the magazine, while the other part 422 lodges slidingly inside a magazine 43 constituted by a rectilinear guideway solid with the movable guideway 3 and provided with a curved end 430 which is coupled tangentially with the circular profile of the part 423 of the chain, forming a point of retrogression D with an incurving guiding means comprising a circular part 330 centered on the axis 370 and coupling at the point of inflection A on a circular part 331 centered on the axis 340 and itself coupling to the guiding means 33 of the downstream guideway 3.

Thus, the outer guide of the connecting guideway 4 is constituted successively by the switch 7, the part 423 of the chain 42 and the curved guiding means 330, 331, and it has a variable length since the part 422 of the chain 42 is put in reserve in the magazine 43 and is able to leave the magazine or enter it according to the orientation of the movable guideway 3.

Passage of the chain into the magazine is assured by a guiding pinion 9 mounted to rotate on the frame of the movable guideway 3 about an axis 90 positioned in a plane P1 passing through the axis 370 of articulation and through the point of retrogression D at which the part 423 and the chain 42 are coupled to the end of the part 330 of the guide 33.

A chain 42 associated with a magazine 43 and a pinion 9 is fixed to each guiding rail 23. The two pinions 9a, 9b are preferably toothed and mesh with the two chains 42a, 42b which are of the sprocket chain type.

The two chains 42a and 42b are represented in more detail in FIGS. 13 to 18.

Figure 13:
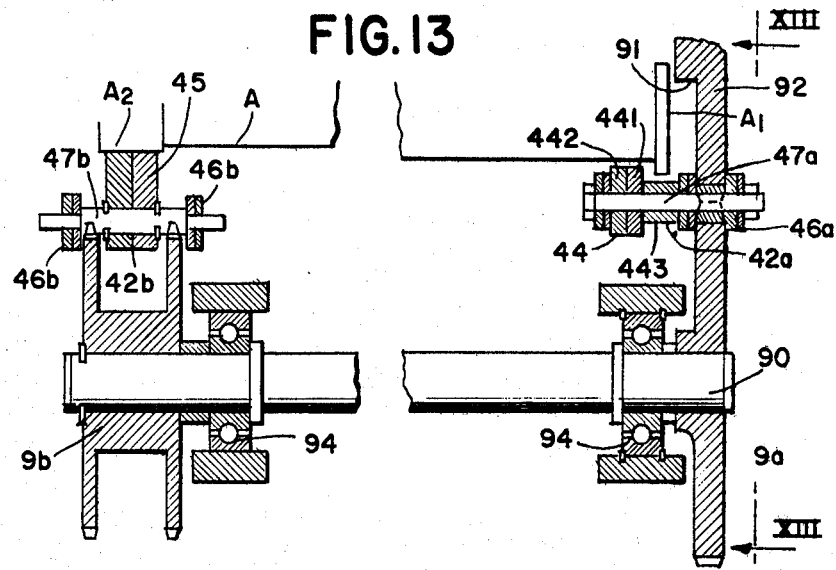
FIG. 13 is a sectional view at C—C of FIG. 12 at a plane passing through the axis of the trunnions.

FIG. 13 is a section at the plane P1 passing through the axis 370 of articulation and the axis 90 of the pinion 9. A piece of ammunition A is represented diagrammatically, particularly including towards the rear a cartridge flange A1 near which the rear rail of the inner or outer guiding means of the guideway bears and towards the front a crimping A2 on which the front rail of the guiding means bears. Consequently, in the same way, in the connecting guideway 4, the piece of ammunition will bear outwards on a part 45 of the rear chain 42a and on a part 44 of the front chain 42b.

Each chain, of the sprocket-chain type, is conventionally constituted by a series of links each comprising two sides 46 connected by the axes 47.

Figure 12:
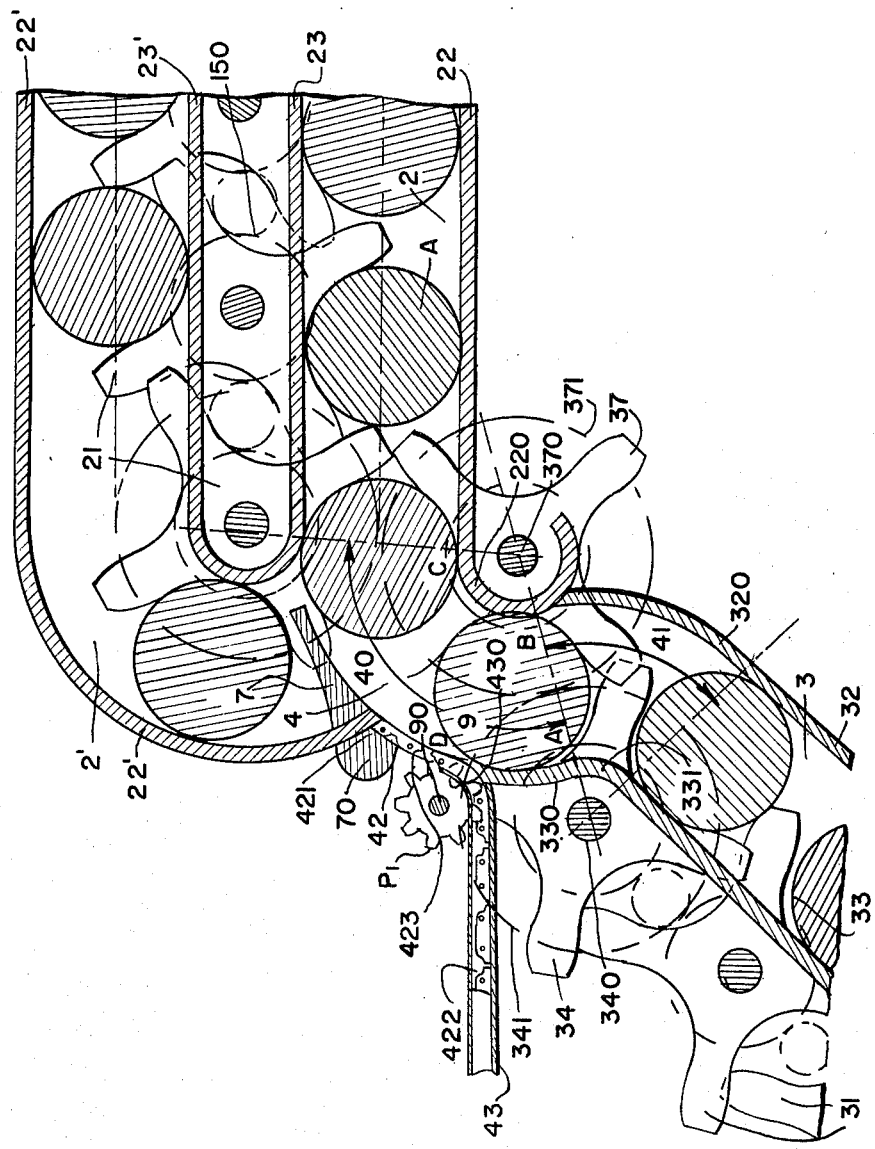
FIG. 12 is a detailed view, in longitudinal section, of the articulated part of an advancing guideway in the case of feeding the swinging mass of a gun pivoting about a trunnion axis.
Figure 14:
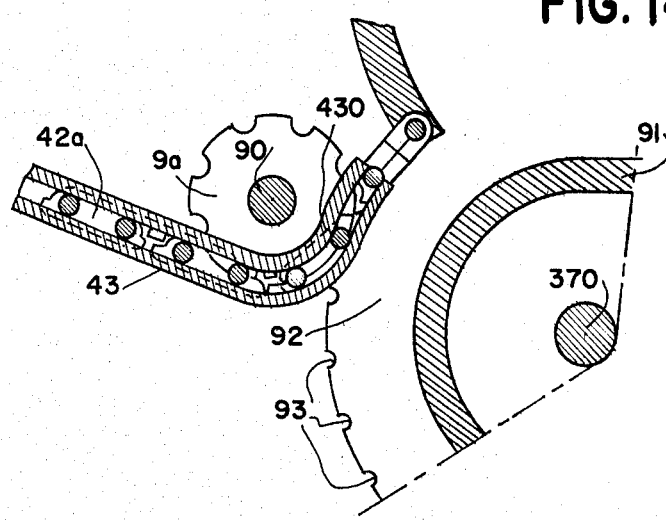
FIG. 14 is a side view at line D—D of FIG. 13.
Figure 15:
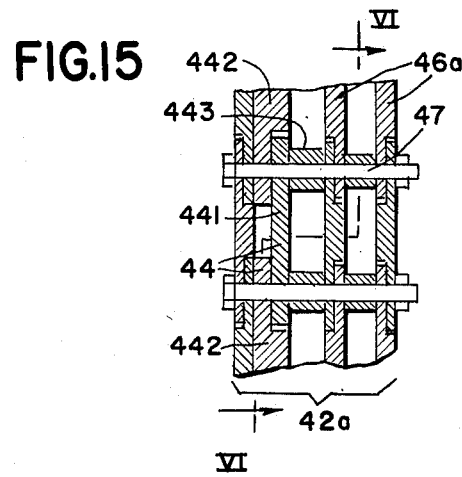
FIG. 15 is a view from above of a link in the rear chain.

The bearing part 44 of the rear chain 42a is intended not only to support the piece of ammunition during its passage in the connecting guideway 4 but also to serve as front axial guiding shoulder bearing on the cartridge flange, rear axial guiding being assured by a boss 91 provided on a pinion 92 which is represented in FIGS. 13 and 14, and on which the rear chain 42a bears so as to assume the required shape of a circle centered on the axis 370 (FIG. 12). For this reason the two sides 46a of the chain 42a are positioned on the side of the chain on both sides of the pinion 92, the latter being provided with notches 93 which mesh with the axes 47a of the chain. The said axes are extended frontwards so as to support a series of sheets 441,442 which constitute the bearing part 44 of the chain and which are kept spaced from the sides 46 by spacing sleeves 443.

The pinion 9a centered on the axis 90 and assuring guiding of the rear chain 42a is positioned in the same plane as the fixed bearing pinion 92, at the rear of the piece of ammunition.

The axis 90, which turns in bearings 94 mounted on the frame (not shown) of the movable guideway 3 bears at its other end the guiding pinion 9b of the front chain 42b.

The latter, which only acts to assure guiding of the piece of ammunition along the guideway, can be symmetrical, the bearing part 45 being positioned between the two sides 46b.

Figure 16:
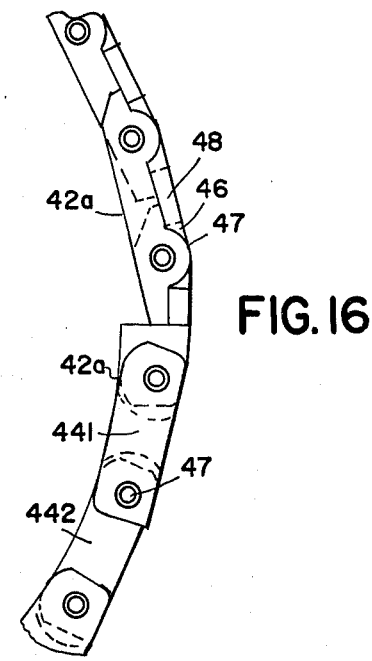
FIG. 16 is a sectional view at line E—E of FIG. 15.
Figure 17:
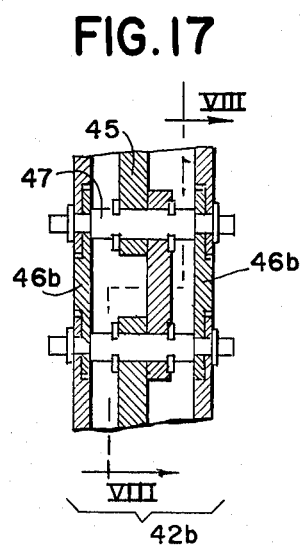
FIG. 17 is a view from above of a link in the front chain.
Figure 18:
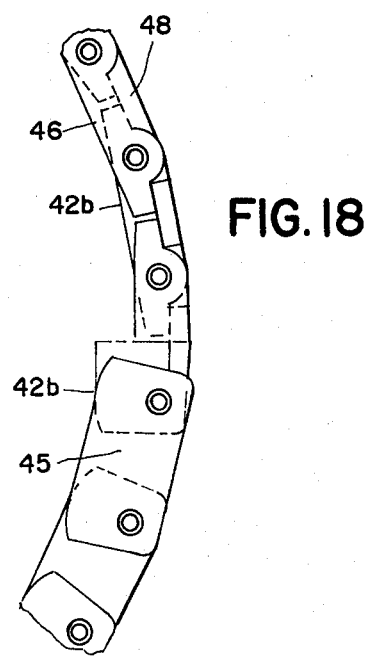
FIG. 18 is a side view at line F—F of FIG. 17.

It is not essential to support the front chain 42b on a fixed tray because it is able to asume the required circular shape naturally, because of blocks 48 allowing the links to bear on each other, as represented in FIGS. 16 and 18.

However, if desired, a bearing plate, like that described for the rear chain, can be used; this need only be shaped so to leave room for the passage of ammunition.

The invention is not limited to the details of the embodiments described which can give rise to other variants, particularly those using equivalent means.

For example, it is possible to modify the construction of the magazine so that this loads in another way. In fact, the possibilities for distribution of special ammunition depend arithmetically on the number of locations in the magazine.

In addition, a particularly compact embodiment has been described, since the use of four-seated plates allows the forward progress of ammunition to be controlled in these simultaneously in the two parts of the magazine. However, a bulkier magazine can also be envisaged in which the intermediate guideway and the additional guideway forming the two parts of the magazine can each be provided with an appropriate series of plates. In this case, ordinary ammunition need not be incorporated with special ammunition. The latter will be kept in reserve in the additional guideway, the plates of which will be disconnected while the downstream guideway is being fed with ordinary ammunition from the upstream guideway. By disconnecting the latter, it is possible to feed the downstream guideway with ammunition by using the intermediate guideway for this.

Lastly, the invention has been described with reference to four-seated plates in the shape of a Maltese cross, but the invention is obviously usable with other types of plate or with chains, if the necessary adaptations are made.

We claim:

1. Apparatus for conveying a succession of cylindrical objects such as ammunition by means of a series of rotary drive members each constituted by at least two separate seating plates fixed on a shaft, said shafts being driven to rotate in synchronism and disposed parallel and equidistant from each other along a cylindrical surface parallel to inner and outer members spaced by a distance at least equal to the diameter of said objects, the inner guiding member being positioned along a surface enveloping the bottoms of the seats of said plates, the whole forming a guideway for advancing objects by successive displacements, said guideway being constituted by three successive parts respectively forming an upstream guideway (1), an intermediate guideway (2) and a downstream guideway (3), said intermediate guideway (2) being constituted by one part of a magazine (20) the other part of which is constituted by an additional guideway (2') which is closed at its two ends on said intermediate guideway (2) so as to form a closed guideway bounded by inner (23') and outer (22') guiding members disposed as extensions of the guiding members (23, 22) of the intermediate guideway (2) and associated with a series (21) of seating plates forming a closed chain of seats with the plates of said intermediate guideway, said outer guiding member (22') being interrupted at the entry and exit of said intermediate guideway (2), respectively, for the passage of objects coming from said upstream guideway (1) and going to said downstream guideway (3), said magazine being associated with two switches (6, 7) respectively positioned at the ends of said intermediate guideway (2) and with individual means for orienting the upstream (6) and downstream (7) switches alternately into a first position assuring continuity of said intermediate guideway (2) respectively with said upstream guideway (1) and with said downstream guideway (3) and a second position assuring continuity of said intermediate guideway (2) with said additional guideway (2') forming the other part of said magazine.

2. Apparatus according to claim 1, wherein said magazine (20) includes n successive locations and is partially filled with objects B, C held in reserve and regularly dispatched in a groups each comprising b objects and each separated from the adjacent groups by an unoccupied location, n, a and b being whole numbers such that n=(b+1) a, and that the ordinary objects A coming from said upstream guideway (1) are inserted during their passage into said intermediate guideway (2) in the unoccupied spaces left between the groups of objects B, C in reserve.

3. Apparatus according to claim 2, wherein said objects A advanced into said upstream guideway are each separated from the next by b unoccupied locations, the drive members (21, 11) of said magazine (20) and of said upstream guideway (1) being controlled in synchronism and set so that the arrival in said intermediate guideway (2) of an object A coming from said upstream guideway (1) coincides with the passage of an unoccupied location of said magazine (20), the upstream point (6) being positioned successively in the first position for continuity of said upstream guideway (1) with said intermediate guideway (2) for the passage of each object A coming from said upstream guideway (1) and in the second position for continuity of said magazine (20) for the passage of b objects B, C in reserve and so on alternately, the downstream switch (7) being controlled in the same way with an interval corresponding to the number of locations in said intermediate guideway (2).

4. Apparatus according to any one of claims 1 to 3, wherein said two switches (6, 7) are each associated with respectively an entry plate (16) and exit plate (37), positioned outside the closed guideway constituting said magazine (20), said entry (16) and exit (37) plates respectively constituting the last plate of said upstream guideway (1) and the first plate of said downstream guideway (3).

5. Apparatus according to claim 4, comprising means for general control in synchronism of the rotation of said plates (11, 21, 31) of said upstream guideway (1), of said magazine (20) and of said downstream guideway (3), and disconnectable means for coupling respectively the plates of said upstream guideway (1) and of said downstream guideway (3), except for said entry plate (16) and said exit plate (37), which are driven continually with the plates of said magazine (20).

6. Apparatus according to claim 1, wherein said intermediate guideway (2) and said additional guideway (2') constituting said magazine (20) are positioned on each side of the same series of plates (21) each provided with a plurality of seats so that the same plates (21) assure the displacement of objects simultaneously in said intermediate guideway (2) and in said additional guideway (2'), the latter forming together a flattened drum about the line of seating plates (21).

7. Apparatus according to claim 4, for feeding an artillery turret comprising a fixed mounting on which a swinging mass supporting a gun is articulated about a trunnion axis, said upstream guideway (1), said intermediate guideway (2) and said additional guideway (2') being positioned in said fixed mounting and said downstream guideway (3) being solid with the swinging mass for feeding said gun, the axis of rotation (370) of said exit plate (37) of said intermediate guideway (2) coinciding with the axis of said trunnions, said exit plate (37) and the succeeding plate (34) of said downstream guideway (3) being positioned on each side of said downstream guideway (3), and said intermediate guideway (2) and said downstream guideway (3) being connected by an incurving connecting guideway (4) forming successively a circular curve (40) of variable length centered on the axis of said exit plate (37) and coupling tangentially on said intermediate guideway (2), and a circular counter-curve (41) centered on the axis of the succeeding plate (34) of said downstream guideway (3) and coupling tangentially, in the upstream direction, on the curve (40), forming a point of inflection, and in the downstream direction on said downstream guideway (3).

8. Apparatus according to claim 7, wherein said incurving connecting guideway (4) is bounded by two pairs of parallel guides coupling respectively to the guides (22) and (23) of said fixed guideway (2) and said movable guideway (3) and each having the shape of a first arc of a circle of variable length (220, 330, 421) centered on the axis of said exit plate (37), followed by a second arc of a circle (320, 331) centered on the axis of the succeeding plate (34) of said movable guideway (3).

9. Apparatus according to claim 8, wherein said pair of guides of the part (40) of said connecting guideway (4) centered on said exit plate (37) is constituted over at least one part of the first arc of a circle of variable length by two chains (42a, 42b) of the sprocket-chain type, one end (421) of which is connected to said outer guide (22') of said magazine (20) as extension of said exit switch (7), and the other end of which (422) lodges by sliding into a guideway (43) forming a magazine and solid in rotation with said movable guideway (3), over a variable length depending on the angular position of said movable guideway (3).

10. Apparatus according to claim 9, wherein at least one of said chains (42a) bears in its circular part on a wheel (42) fixed on the shaft (370) of said exit plate (37).

11. Apparatus according to claim 9, wherein said movable guideway (3) is provided with two guiding pinions (9), each of a corresponding chain (43), said pinions (9) being centered on axes (90) each positioned in a plane P1 passing through the axis of said trunnions (370) and through the junction point D between the end of said movable guiding means (330) and said chain (42).

12. Apparatus according to claim 8, wherein said exit plate (37) and the succeeding plate (34) of said movable guideway (3) are driven to rotate at the same speed and in opposite directions, whatever the orientation of said movable guideway, by toothed wheels (371) (341) fixed on the shafts (370; 340) of said plates (37) and (34) and meshing with each other, said wheels having pitch diameters equalling the interaxial spacing of said shafts (370; 340).

* * * * *